Dec. 19, 1961 A. F. ERICKSON 3,013,393
BRAKE FLUID SYSTEM
Filed July 15, 1959 3 Sheets-Sheet 1

INVENTOR.
ANTON F. ERICKSON
BY
HIS ATTORNEY

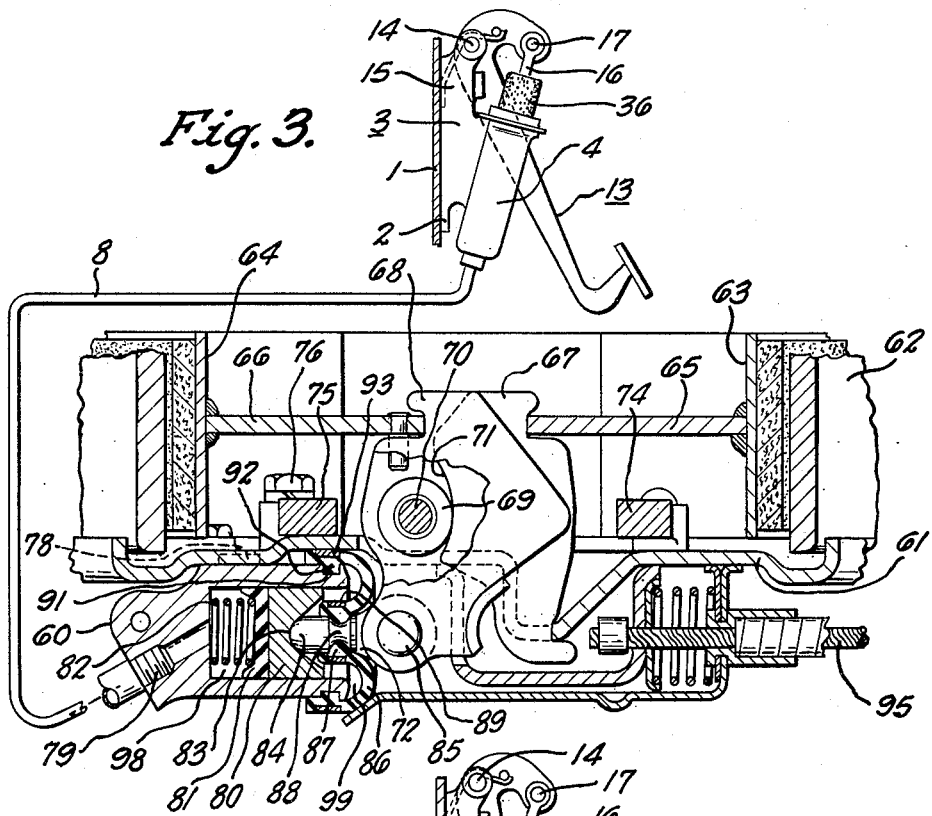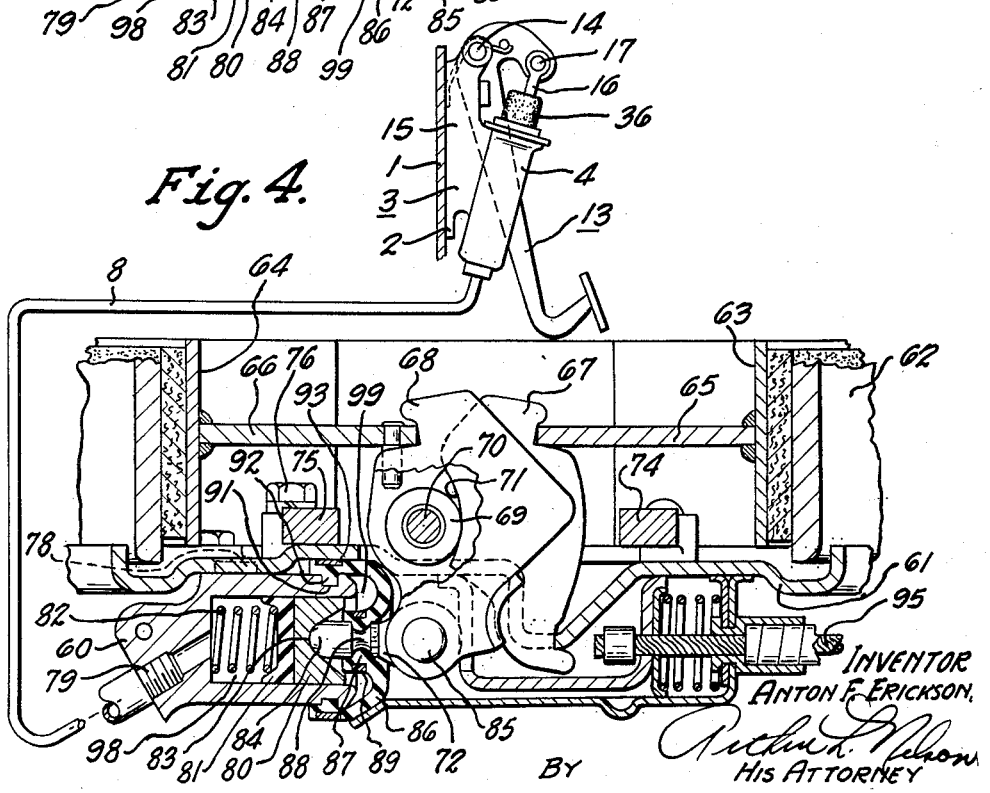

Dec. 19, 1961    A. F. ERICKSON    3,013,393
BRAKE FLUID SYSTEM

Filed July 15, 1959    3 Sheets-Sheet 3

INVENTOR.
ANTON F. ERICKSON
BY
HIS ATTORNEY

3,013,393
BRAKE FLUID SYSTEM

Anton F. Erickson, Dayton, Ohio, assignor to General Motors Corporation, Detroit, Mich., a corporation of Delaware
Filed July 15, 1959, Ser. No. 827,297
5 Claims. (Cl. 60—54.5)

This invention relates to a vehicle braking system and more particularly to a sealed brake actuating fluid system.

A brake fluid system usually is provided with some venting means to permit air to enter as the flluid becomes lower due to leakage or vaporization. The venting means usually provides for intake and exhaust of air. This breathing of moisture laden air within the fluid system permits moisture to enter the brake fluid and thereby lower the boiling point of the brake fluid. It also permits entrance of impurities which may hinder the operaion of the fluid system. Accordingly, this invention is intended to overcome these disadvantages. The sealed fluid system devised by the inventor permits entrance of air only when the fluid has become permanently lowered. The small changes in volume caused by temperature changes are overcome by an expanding and contracting means.

It is an object of this invention to provide a sealed boot operated in conjunction with the master cylinder and also a sealed boot on each of the hydraulic wheel cylinders to provide a closed system for the hydraulic brake fluid system.

It is another object of this invention to provide a sealed boot on the master cylinder which performs the function of preventing impurities from entering the fluid system at this point and eliminates friction as it replaces the conventional secondary piston seal as well as providing an expansible and contractable means for slight variations in volume of the air chambers within the fluid system.

It is a further object of this invention to provide a fluid reservoir in communication with the forward and rearward side of the master piston and the master cylinder which in turn provides for lubrication of the master piston as well as free movement of the piston within the master cylinder. It is intended that the hydraulic wheel cylinders be provided with a sealed boot to force the hydraulic fluid back into the fluid system and also permit lubrication of the piston on the cylinder walls.

It is a further object of this invention to provide a fluid relief valve for the inlet of air within the fluid system. It is intended that this relief valve should permit only the inlet of air and not the exhaust of air and thereby eliminate breathing within the fluid system.

It is a further object of this invention to provide a flexible boot sealing the push rod which operates the master piston. This seal assembly is also intended to seal the master cylinder and provide a stop in the return position for the master piston.

The objects of this invention are accomplished by means of a master cylinder located in a generally vertical position and having a sealed boot on its upper end which receives the push rod for the master piston. The master cylinder is cast in an integral unit with a reservoir and is provided with communication between the reservoir chamber and the upper and lower sides of the master piston. This structure provides communication between the upward side of the master piston to an air chamber within the sealed boot. The sealed boot being of a flexible material provides for expansion and contraction of the air within the chamber for relatively small changes in temperature. The air chamber in the reservoir being in communication with the master cylinder, is provided with a relief valve for entrance of air upon a depletion of fluid within the brake fluid system.

A plurality of hydraulic wheel cylinders are also employed in the fluid system. These hydraulic wheel cylinders have a single seal within the hydraulic wheel cylinder placed on the hydraulic piston. A second seal is also provided by a boot on the external end of the hydraulic wheel cylinder. The boot is filled with fluid upon assembling of the piston end cylinder. In operation the boot functions as a pump constantly forcing any leakage of fluid by the hydraulic wheel piston back into the brake fluid system.

Further objects and advantages of the present invention will be apparent from the following description, reference being had to the accompanying drawings wherein preferred embodiments of the present invention are clearly shown.

In the drawings:

FIGURE 3 is a cross-section view of the vehicle brake and the hydraulic wheel cylinder also in communication with the hydraulic master cylinder. The brake is shown in the retracted position.

FIGURE 4 is a similar view of the brake as shown in FIG. 3 except the brake is shown in the activated position.

Figures 1, 2:
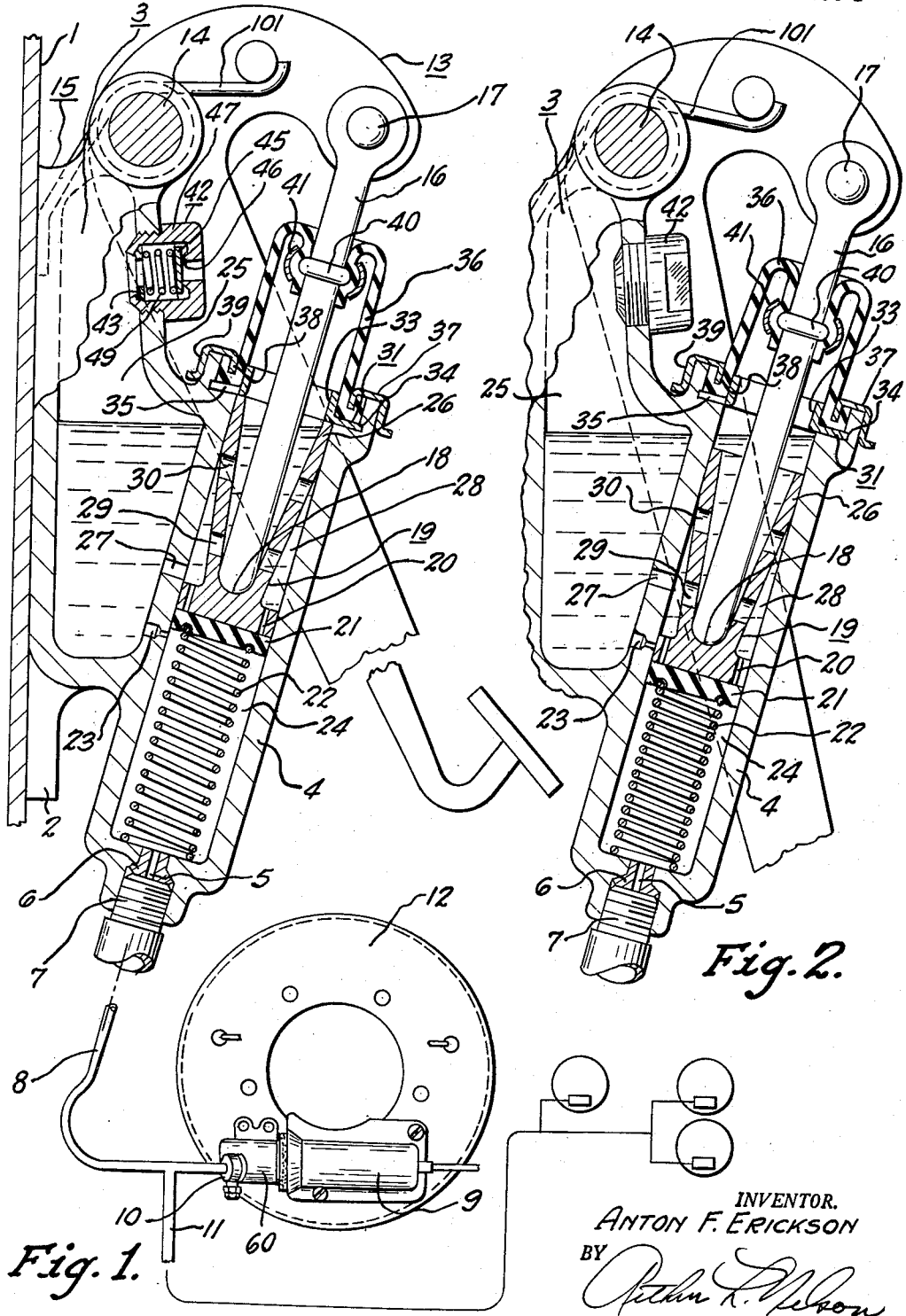
FIGURE 1 is a cross-section view of the master cylinder and the manual operating means connected to the hydraulic wheel cylinder. This view shows the master cylinder in the retracted position.
FIGURE 2 is a cross-section view of the master cylinder in the actuated position.
Figure 5:
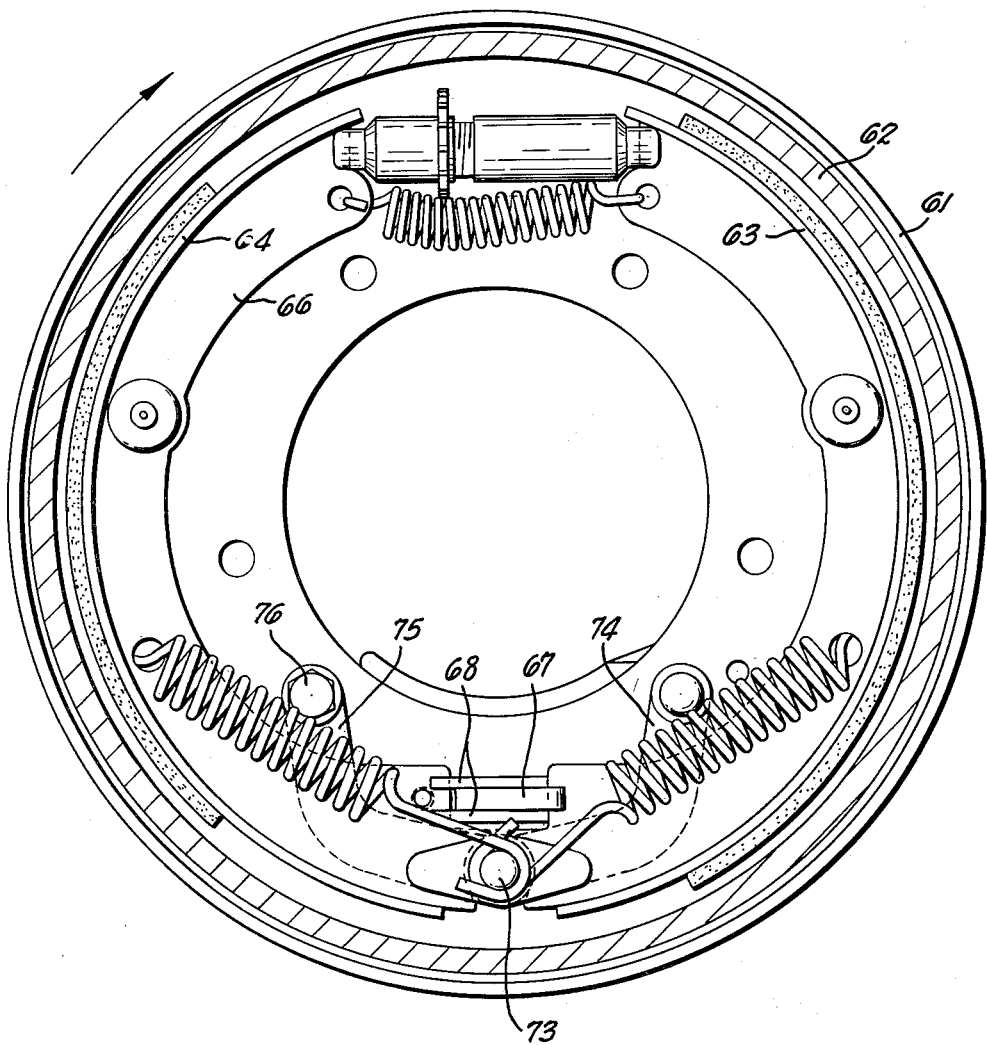
FIGURE 5 shows the relative location of the various parts within the brake.

The master cylinder is mounted on a vertical supporting wall 1 by means of the back facing plate 2 on the brake fluid reservoir 3. The brake fluid reservoir 3 is constructed of a unitary casting including the master cylinder 4. The master cylinder 4 is provided with an outlet port 5 which leads to the vehicle brakes. This outlet port receives an insert 6 and a fitting 7 which threadedly engages the lower end of port 5. The fitting 7 is connected to the fluid conduit 8 which leads to a hydraulic wheel cylinder 60. The hydraulic wheel cylinder 60 is provided with a fitting 10 and a connection 11 which leads to a plurality of wheel cylinders not shown. The wheel cylinder 60 is shown mounted on the brake backing plate 12.

Manual lever 13 is pivotally mounted by pin 14 in the upper end of the unitary casting 15. The lever 13 pivotally supports the push rod 16 by means of the pin 17. The push rod 16 extends downwardly into the hydraulic master cylinder 4 where it engages a semispherical depression 18 in the upper end of the master piston 19. The forward end of the master piston 19 is provided with passage means 20 through the piston. A seal 21 is also placed on the lower end of the master piston 19. This seal 21 is retained in its position of the piston return spring 22. The pedal return spring 101 engages the pedal 13 and the unitary casting 15.

When the master piston 19 is in its return position as shown in FIG. 1, the lower port 23 provides communication between the lower end of the master cylinder fluid pressurizing chamber or compartment 24 and the reservoir chamber 25. The upper end of the master piston 19 has a flared portion 26 which engages the inner periphery of the master cylinder 4 and serves as a guide within the master cylinder 4. A second port 27 places a reservoir chamber 25 in communication with the reservoir end chamber or compartment 28 of the upper end of the master cylinder 4. The rearward end or upper end of the master piston is also provided with passages 29 and 30 to permit fluid to seek the same level within the upper portion of the master cylinder 4 and the reservoir chamber 25.

The upper end of the master cylinder 4 is provided with a seal assembly including a snap ring 31 which is inserted within an annular groove 34 on the inner periphery of the master cylinder 4. This snap ring has an axially extending flange 33 and a radially extending flange 35. The radially extending flange 35 has segments that are cut away to permit radial contraction and expansion for insertion within the annular groove 34. The snap ring 31 also operates as a seating member for the master cylinder boot 36. A further function of the snap ring 31 is to provide a stop for the return of the master piston 19 in its retracted position.

A master cylinder boot 36 is placed within the inner periphery of the master cylinder 4 and is firmly seated in this position by a retainer cup 37. The retainer cup 37 has a radially inner axially extending flange 38 which is received within a mating groove in the master cylinder boot 36. As the retainer cup 37 is seated within this groove in the master cylinder boot a second axial flange 39, which is radially outward from the first flange 38, fits the outer periphery of the upward end of the master cylinder 4. When the retainer cup 37 is firmly seated on the outer periphery of the master cylinder end and also fitted into the groove in the master cylinder boot, a positive seal is provided on this portion of the fluid system.

The master cylinder boot 36 extends upward concentrically around the push rod 16. The opposite end of the master cylinder boot forms a smaller diameter than the lower end and is folded downward to fit a ridge portion 40 on the push rod 16. The master cylinder boot is held in a sealed position by means of the annular ring 41 which clamps about the outer periphery of the upper end of the master cylinder boot. This also forms a fluid tight seal on this end of the master cylinder boot to prevent any leakage of fluid into or out of the fluid system.

The master cylinder reservoir 3 has a vacuum relief valve 42 placed on its upper end. This relief valve 42 includes a housing 47 enclosing a spring seat 43 and a coil spring 49. The coil spring 49 engages a valve 45 and engages the inner portion of valve seat 46 of the valve assembly 42. It is noted that the valve assembly 42 provides a positive seal against any exhaust of fluid from the brake fluid system. The valve assembly 42 permits inlet only of any fluid to the system.

FIGURE 3 illustrates the vehicle wheel brake in cross section. The vehicle wheel brake includes the hydraulic wheel cylinder 60 in communication with the conduit 8 and the hydraulic master cylinder 4. A hydraulic master cylinder 4 is operated by the manual control lever 13 pivotally mounted on the unitary casting 15. The braking structure is mounted on a backing plate 61. The rotating brake drum 62 is mounted adjacent to the backing plate 61 and concentric with the backing plate. Two brake shoes 63 and 64 are mounted within the rotating drum 62. Brake shoes 63 and 64 are actuated through their respective webbings 65 and 66. The brake shoe 63 is operated by a lever 67 which engages the webbing 65 and backing plate 61. A second lever 68 is pivotally mounted to actuate through roller 69 and pin 70. The pin 70 supports the roller 69 which rolls against the arcuate portion 71 on the lever 67.

The pivoting and rolling action of link 68 is accomplished by the push rod 72 engaging and pivotally supported by lever 68. An anchor pin 73 is placed between the cooperative adjacent ends of the brake shoes 63 and 64. The mounting portion of anchor pin 73 is shown in the cross-section portions 74 and 75 in FIG. 3. The bolt 76 operates in a manner to fasten the portion 75 of the anchor pin and the hydraulic wheel cylinder 60. The hydraulic wheel cylinder 60 also has an embossment 78 extending through the backing plate 61 to prevent rotation of the hydraulic cylinder 60 in its mounting.

The hydraulic wheel cylinder 60 is connected to the conduit 8 by means of fitting 79. Hydraulic piston 80 is mounted within the inner periphery of the wheel cylinder 60. The piston 80 operates in conjunction with a seal 81 mounted on the end of the piston 80. The seal 81 is held in position against the end of the piston 80 by means of spring 82.

The outer end of the piston 80 has semi-spherical depression 83 for reception of a semi-spherical head 84 of push rod 72. The push rod 72 is connected to lever 68 by pin 85. The push rod has an annular recess about its central portion for receiving one end of a boot 86. The annular ridge 87 of boot 86 is received within the annular recess 88 of the push rod 72. A positive seal is maintained on this end of the boot by means of a metallic band 89.

The wheel cylinder 60 is provided with an annular groove 91 for reception of a mating annular ridge 92 on the boot 86. A positive seal is maintained between the boot 86 and the hydraulic wheel cylinder 60 by means of the band 93.

A manual means for actuation of the vehicle brakes is shown connected to the brake cable 95. The device provides for a secondary means of operation of the vehicle brakes.

The operation of the hydraulic fluid system will be described in the following paragraphs. As the manual lever 13 is depressed, the push rod 16 moves inward carrying the master piston 19 downward within the master cylinder 4. The upper end of the master cylinder is sealed to the lower end of the master cylinder boot 36. The push rod 16 is sealed in its connection with the boot 36. As the push rod 16 moves downward, the piston and the seal 21 close off port 23 which is connecting compartment 24 of the master cylinder 4 with the reservoir chamber 25. Further movement of the brake pedal 13 and the corresponding movement of the master piston 19 compresses the fluid within the master cylinder compartment 24 thereby actuating the vehicle brakes.

This downward movement of the master piston lowers the level of the hydraulic brake fluid in the compartment 28 in the upper end of the master cylinder 4. Simultaneously with this downward movement of the fluid, the volume within the boot is decreased. This decreased volume within the boot is accompanied by the flow of fluid behind the master piston 19 as the piston moves downward. The boot 36 is flexible and any decrease in boot volume is accompanied by an increase in volume behind the piston 19 in compartment 28. This is accomplished without drawing any vacuum within the system. The pressure within the reservoir chamber 25 and the master cylinder chamber 28 remains relatively constant and therefore no additional air is drawn within the pressure relief valve 42. The piston 19 is lubricated by fluid in chamber 28.

The pressure within the lower chamber 24 of the master cylinder is pressurized. This induces a pressurization of the fluid wtihin the the conduit 8 which leads to the hydraulic wheel cylinder 60. Pressurization of the fluid within conduit 8 also pressurizes the fluid within the chamber 98 of the wheel cylinder 60. Pressurization of chamber 98 and wheel cylinder 60 moves the wheel piston 80 axially outward. This movement carries the push rod 72 and the radially inner portion of the boot 86. The chamber 99 within the boot is filled with fluid. The movement of the piston 80 within the cylinder 60 is a relatively small distance and the change of volume within the boot 86 is so constructed that its volume change is relatively small. It was previously pointed out that the boot is sealed with the outer periphery of the hydraulic wheel cylinder 60 and the inner periphery of the push rod 72. For this reason any change in pressure within the chamber 99 is accomplished by the flexing of the boot 86. If an excessive amount of fluid should enter the chamber, which as previously mentioned is filled with fluid upon assembly, then the boot will work with a pumping action to force the fluid back into the brake fluid system when the brakes are released.

The hydraulic wheel cylinder as shown provides an externally mounted wheel cylinder which is located in a relatively cool position relative to the rotating brake drum 62 and brake shoes. The system is closed to avoid entrance of any moisture and impurities. The boot seals reduce friction and also provide lubrication of the pistons within their cooperating cylinders.

As the brakes are released, the manual control lever 13 pivots about the pin 14 and returns to the retracted position by force of spring 101. This pivoting action releases the master piston 19 within the master cylinder 4. The pressure on the forward side of the seal 21 on the master piston 19 and the spring 22 biases the piston 19 to the upward position thereby relieving the pressure on the forward side of seal 21. As the piston 19 returns upward, the port 23 is again uncovered and provides communication between compartment 24 of the master cylinder and the reservoir chamber 25.

The fluid behind the master piston 19 is moved upward to again fill the compartment 28 and reservoir chamber 25 to the previous level. The master cylinder boot 36 moves upward to its original position. The brake fluid lines are in a normal unpressurized state. In the event of leakage and a sufficient decrease in air pressure within the reservoir 25, then the valve 42 will permit air to enter into chamber 25.

The hydraulic wheel cylinders 60 will also return to their retracted position under the pressure of the brake shoe retraction springs. The boot returns to its original position as shown in FIG. 3. If an excess in fluid has entered the chamber 99 of boot 86, the fluid within the chamber 99 will be forced about the outer periphery of piston 80 and back into the wheel cylinder 60, the action of the boot being a pumping action or a sealing action which prevents any impurities from entering the fluid system at this point.

While the embodiments of the present invention as herein disclosed, constitute preferred forms, it is to be understood that other forms might be adopted.

What is claimed is as follows:

1. In a motor vehicle, a sealed brake fluid system comprising in combination; a master cylinder, a fluid displacement member operating in cooperation with said master cylinder to pressurize fluid within said fluid system, a fluid reservoir in commuciation with the pressurizing end of said master cylinder, an actuating end in said master cylinder located above said pressurizing end of said master cylinder for receiving actuating means for actuating said fluid displacement member, said fluid displacement member and said master cylinder provided with opening means to place said fluid reservoir in communication with said actuating end of said master cylinder, a boot means forming a secondary seal and a fluid expansion means on the actuating end of said fluid displacement member, said boot means providing a stop means for said fluid displacement member in its retracted position, a plurality of hydraulic fluid wheel cylinders adapted for actuation of vehicle braking means, conduit means connecting said hydraulic master cylinder with said hydraulic wheel cylinders, a seal means within each of said hydraulic wheel cylinders forming a fluid pressurizing chamber adapted for actuating of said braking means, a boot means forming a secondary seal means external of said hydraulic wheel cylinders, said boot sealing means operating as a fluid pump to return fluid leakage from each of said hydraulic wheel cylinders during actuation of said vehicle brakes to return the fluid to said hydraulic fluid system when said vehicle brakes are released.

2. In a motor vehicle a closed brake actuating fluid system comprising in combination; a master cylinder, a fluid reservoir forming a fluid chamber, a fluid displacement member operating within said master cylinder, said fluid displacement member dividing said master cylinder into a fluid pressurizing compartment and a fluid reservoir compartment, said fluid reservoir chamber and said reservoir compartment of said master cylinder having means for intercommunication, said fluid reservoir having a venting means including a one-way valve for inlet of air, said master cylinder having a flexible seal means on the reservoir compartment end, a means for actuating said fluid piston, said sealing means on said reservoir compartment end of said master cylinder providing a secondary seal means with said actuating means to thereby provide an expandable and collapsible means for compensating variations in pressure within said fluid system when said vehicle brakes are actuated, a plurality of hydraulic fluid wheel cylinders adapted for actuating vehicle brakes, conduit means connecting said pressurizing chamber in said master cylinder with said plurality of hydraulic wheel cylinders, a flexible boot seal means mounted externally on said hydraulic wheel cylinder having a closed fluid chamber to operate as a pump to return fluid leakage from said hydraulic wheel cylinder to said hydraulic braking system when said vehicle brakes are released.

3. In a motor vehicle a sealed brake actuating fluid system, comprising in combination; a master cylinder, a fluid reservoir in communication with said master cylinder, a fluid piston operating within said master cylinder and separating said master cylinder into a pressurizing fluid compartment below a fluid reservoir compartment, passage means in said master cylinder for placing said pressurizing fluid compartment and said reservoir chamber in said master cylinder in communication with said fluid reservoir, manual means for axially moving said master piston in said master cylinder for pressurization of fluid within said pressure compartment, an external secondary seal means on the reservoir end of said master cylinder and on said manual control means to thereby form a sealed gaseous fluid compartment on said reservoir end of said master cylinder, said seal means forming a stop means for said master piston in its return position in said master cylinder, said external seal means on said reservoir end of said master cylinder providing a flexible means for compensating of variations in pressure within said fluid system upon actuation of said manual control means, a venting means within said reservoir including an inlet valve means, a plurality of hydraulic fluid wheel cylinders adapted for actuation of vehicle brakes, a conduit means connecting the pressurizing chamber in said master cylinder with said plurality of wheel cylinders, each of said hydraulic wheel cylinders including a fluid piston having a primary seal on its outer periphery engaging said hydraulic wheel cylinder, an external boot seal means externally mounted on said hydraulic wheel cylinder and forming a secondary seal with said hydraulic wheel cylinder and said hydraulic piston, said boot seal means on each of said hydraulic wheel cylinders forming a closed fluid chamber external of said hydraulic wheel cylinder and operating as a pumping means for returning of any leakage of fluid to said fluid system when said fluid brakes are released.

4. In a motor vehicle a sealed brake actuating fluid system, comprising in combination; a fluid reservoir, a master cylinder positioned in a substantially vertical position, a master piston operating within said master cylinder, said master piston separating said master cylinder into a pressurizing fluid compartment and a reservoir compartment each in communication with said fluid reservoir, a seal means on said hydraulic master piston for pressurizing fluid in said pressurizing fluid compartment, a flexible external boot seal mounted on the reservoir end of said master cylinder forming a seal means about the outer periphery of said master cylinder, said boot seal operating as a seal means and a stop means for said hydraulic master piston in its return position in said hydraulic master cylinder, means for axially moving said hydraulic master piston in said hydraulic master cylinder, said boot on said reservoir end of said master cylinder thereby forming a sealed chamber within said boot and also providing a means to compensate for variation of pressure within said brake fluid system when said vehicle brakes are actuated, a one-way check valve mounted on said fluid reservoir to permit limited inlet of air and present breathing of air within said fluid system, a plurality of hydraulic fluid wheel cylinders, conduit means connecting the pressurized end of said master cylinder with said plurality of hydraulic wheel cylinders, a hydraulic wheel piston operating within each of said hydraulic wheel cylinders, said hydraulic wheel piston operating through a push rod adapted for actuation of vehicle braking means, said push rod having a grooved portion for reception of a portion of a boot, said boot forming a seal on the outer periphery of said hydraulic wheel cylinder and with said annular groove on said push rod to form a sealed chamber enclosing hydraulic fluid external of said hydraulic fluid system, said wheel cylinder boot being of a flexible material to provide a pumping action for return of leakage fluid to said hydraulic fluid system when said vehicle brakes are released.

5. In a motor vehicle, a closed brake actuating fluid system comprising in combination; a fluid reservoir, a hydraulic fluid master cylinder in communication with said fluid reservoir, a check valve in said fluid reservoir to provide limited inlet of air within said reservoir, a master piston operating axially within said master cylinder and dividing said internal portion of said master cylinder into a pressurizing compartment and a reservoir compartment, manual means axially operating said master piston within said master cylinder, an external boot mounted on the reservoir end of said master cylinder forming a positive seal means, said positive sealing means including an expandable ring mounted within an annular depression on the inner periphery on the reservoir end of said master cylinder, an annular recess in said boot for reception of a retainer cup forming a clamping action on the external portion on the reservoir end of said master cylinder and the annular groove on said boot, the opposite end of said boot forming a positive seal means with the actuating means extending into said master hydraulic cylinder thereby providing a closed compartment within said boot in communication with the reservoir end of said hydraulic master cylinder, said rearward end of said master piston having opening means placing the reservoir end of said master cylinder in communication with said fluid reservoir, a plurality of hydraulic wheel cylinders for actuation of vehicle brakes, conduit means connecting said pressurizing chamber of said master cylinder with said hydraulic wheel cylinders, a boot mounted on the outer periphery of each of said hydraulic wheel cylinders thereby forming a secondary seal, said boot having a seal means formed on the outer periphery of said hydraulic wheel piston means thereby forming a closed fluid chamber external of said hydraulic fluid system, said hydraulic wheel cylinder boot being of a flexible material thereby causing a pumping action for return of hydraulic fluid from said chamber into said hydraulic fluid system when said hydraulic brakes are released.

References Cited in the file of this patent

UNITED STATES PATENTS

| | | |
|---|---|---|
| 1,721,213 | Frock | Jan. 16, 1929 |
| 1,943,679 | Le Cour et al. | Jan. 16, 1934 |
| 1,963,114 | Bowen | June 19, 1934 |
| 1,981,653 | Loweke | Nov. 20, 1934 |
| 2,018,325 | Schnell | Oct. 22, 1935 |
| 2,037,474 | Loweke | Apr. 14, 1936 |
| 2,050,702 | Jackson | Aug. 11, 1936 |
| 2,060,846 | Bowen | Nov. 17, 1936 |
| 2,070,298 | Schnell | Feb. 9, 1937 |
| 2,125,129 | Sauzedde | July 26, 1938 |
| 2,136,835 | Begg | Nov. 15, 1938 |
| 2,188,355 | Hunt | Jan. 30, 1940 |
| 2,637,976 | Myers et al. | May 12, 1953 |
| 2,679,729 | Swift | June 1, 1954 |
| 2,687,015 | Edwards | Aug. 24, 1954 |
| 2,691,270 | Comellas | Oct. 12, 1954 |
| 2,728,195 | Mills | Dec. 27, 1955 |
| 2,758,444 | White | Aug. 14, 1956 |
| 2,844,940 | Huber | July 29, 1958 |